Figure 1:
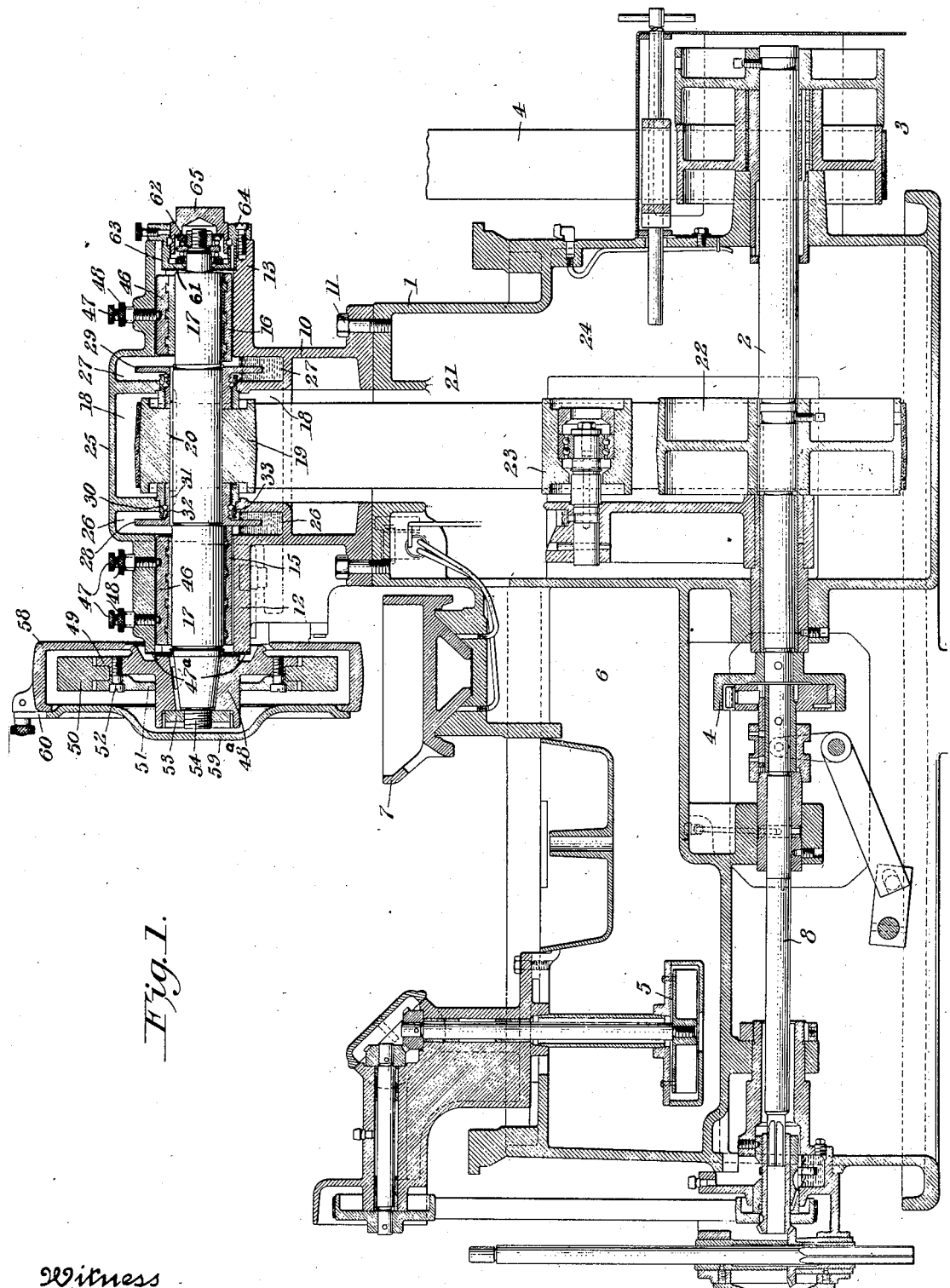

March 30, 1926. 1,578,967
S. EINSTEIN
SPLASH OILED HALF BEARING FOR GRINDERS
Filed March 5, 1923 3 Sheets-Sheet 1

Witness
L. E. Fischer

Inventor
Sol Einstein
By Albert F. Nathan
Attorney

March 30, 1926.
S. EINSTEIN
1,578,967
SPLASH OILED HALF BEARING FOR GRINDERS
Filed March 5, 1923
3 Sheets-Sheet 2
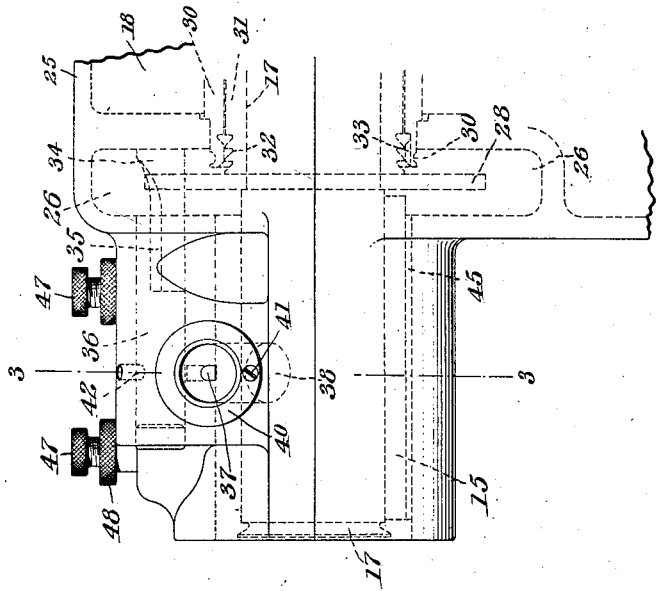
Witness
L. E. Fischer
Inventor
Sol Einstein
By Attorney
Albert F. Nathan March 30, 1926.

S. EINSTEIN 1,578,967

SPLASH OILED HALF BEARING FOR GRINDERS

Filed March 5, 1923  3 Sheets-Sheet 3

Inventor
Sol Einstein
By
Albert F. Nathan  Attorney

Patented Mar. 30, 1926.

1,578,967

UNITED STATES PATENT OFFICE.

SOL EINSTEIN, OF CINCINNATI, OHIO, ASSIGNOR, BY MESNE ASSIGNMENTS, TO THE CINCINNATI MILLING MACHINE COMPANY, OF CINCINNATI, OHIO, A CORPORATION OF OHIO.

SPLASH-OILED HALF BEARING FOR GRINDERS.

Application filed March 5, 1923. Serial No. 622,866.

*To all whom it may concern:*

Be it known that I, SOL EINSTEIN, a citizen of the United States, and residing at Cincinnati, in the county of Hamilton and State of Ohio, have invented a new and Improved Splash-Oiled Half Bearing for Grinders, of which the following specification is a full disclosure.

This invention relates to devices for the lubrication of rotating shafts, and is of particular utility when embodied in the construction of bearings for the rapidly rotating spindles of grinding machines, although I contemplate the use of my improvements in any field for which they are adapted by their nature.

In such grinding machines, the grinding devices are usually associated with a head carried by a spindle-shaft mounted in bearings supported by a portion of the frame of the machine, and it is desirable to provide relatively broad bearings, spaced apart, for the sake of greater stability, the spindle being provided with a pulley, on a portion of its shaft between the bearings, and a driving-belt which runs to this pulley from a driving pulley on the main driving-shaft.

It has been found difficult to provide for the proper distribution of lubricant to such broad bearings in quantities commensurate with the speed of rotation thereof, and also to avoid slippage of the driving-belt due to the presence of lubricant coming from the lubricating devices employed heretofore, on account of the inadequate character of the means used for circulation of the lubricant.

Accordingly, an object of primary importance in my invention is to provide an improved spindle-head for machines in the nature of grinding machines, in which, according to my invention there is a broad duplex bearing for the spindle-shaft, comprising splash-oiled half-bearing parts spaced apart upon the supporting structure, the latter being provided with duplex individual lubricant chambers in communication with the respective half-bearings, one for each, while a separate central chamber is provided between these lubricant chambers, in which central chamber is situated the driven-pulley mounted on the middle portion of the spindle-shaft, the shaft being provided also with duplex peripheral flanges, one for each half-bearing, these flanges being arranged to dip into the lubricant contained in the lower portion of the lubricant chambers and to serve as lubricant-elevators, carrying lubricant to the upper portion of the chambers, above the level of the shaft, where it is discharged by centrifugal force and is led to the adjacent half-bearings, respectively.

A further object of my invention is to provide novel duplex devices to divert and conduct the lubricant, thus elevated, to the entire length of each of the half-bearings, preferably by means of duplex baffle-members, one in the upper portion of each lubricant chamber, which intercept the lubricant as it is thrown from the upper portions of the rotating flanges, and which are so constructed that the lubricant flows down into the bearings by gravity, and eventually returns to the lubricant chamber through a conduit provided in the lower portion of the bearing, thus insuring a continuous circulation of lubricant, in quantities exactly commensurate with the speed of rotation of the spindle-shaft.

To accomplish this purpose effectively, I have devised a novel structure and arrangement of half-bearings, in which, according to my invention, the half-bearing members extend from a region about 30° below the axis of the spindle-shaft on the forward side, to a region about 30° above the axis toward the rear, and in addition to these half-bearing members I provide auxiliary members to aid in retaining the spindle-shaft in properly seated position upon the half-bearings, the auxiliary member being arranged to bear against the spindle-shaft at a region approximately at the highest portion of the spindle-shaft.

The half-bearing members and auxiliary members act successively upon the lubricant to distribute it over the length of the bearings, insuring repeated and complete lubrication thereof.

Still another object of my invention is to provide means by which the operator may inspect the duplex half-bearings and lubricating-devices in action, and for this purpose I prefer to provide each half-bearing with a glazed sight-opening so arranged that the rotating-shaft will be visible and also the lubricant flowing thereto from the baffle-devices.

Further objects of my invention are to provide means to prevent any access of lubricant from the lubricant-chambers to the central belt-chamber, and this I accomplish by means of devices which receive any lubricant tending to seek such access, and return it automatically to the lower portion of the respective lubricant chambers.

I provide also for complete enclosure of the rotating parts, and preferably for ready inspection thereof, by a casing comprising two portions, of which the upper one can be removed without disturbing the operating members.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 5:
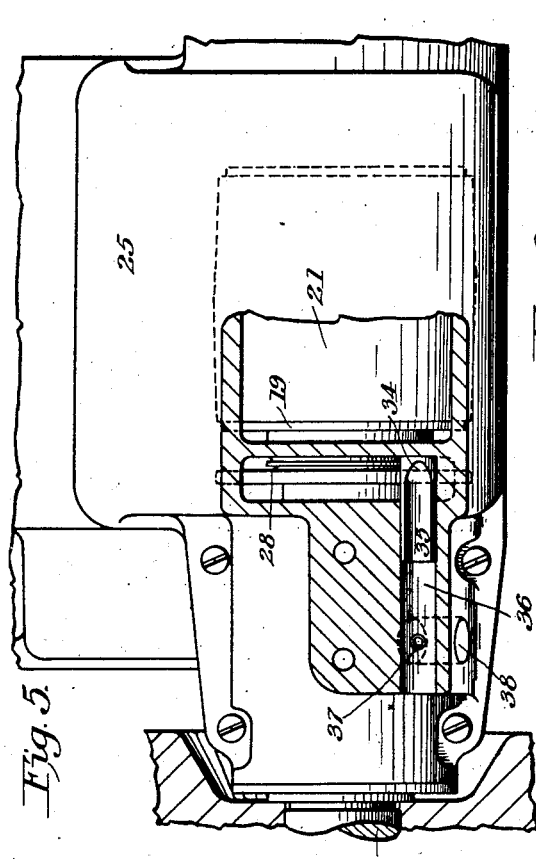
Figure 6:
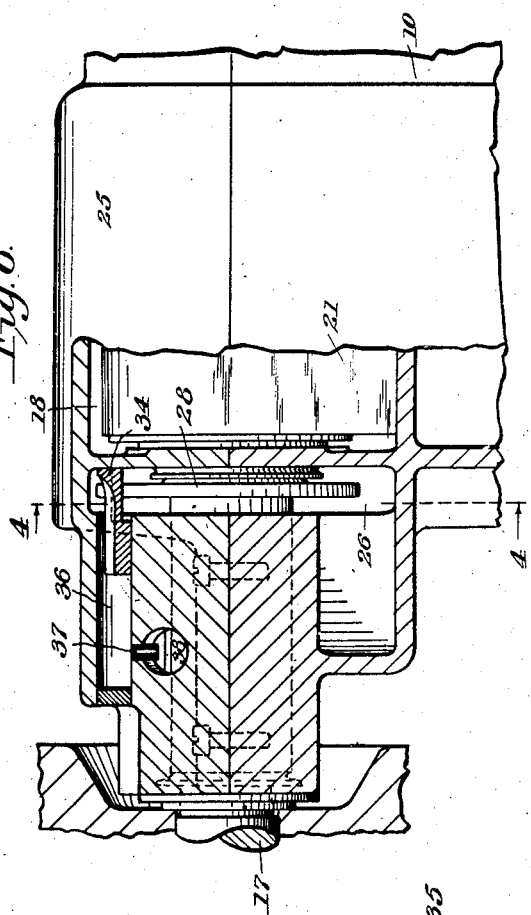
Figure 4:
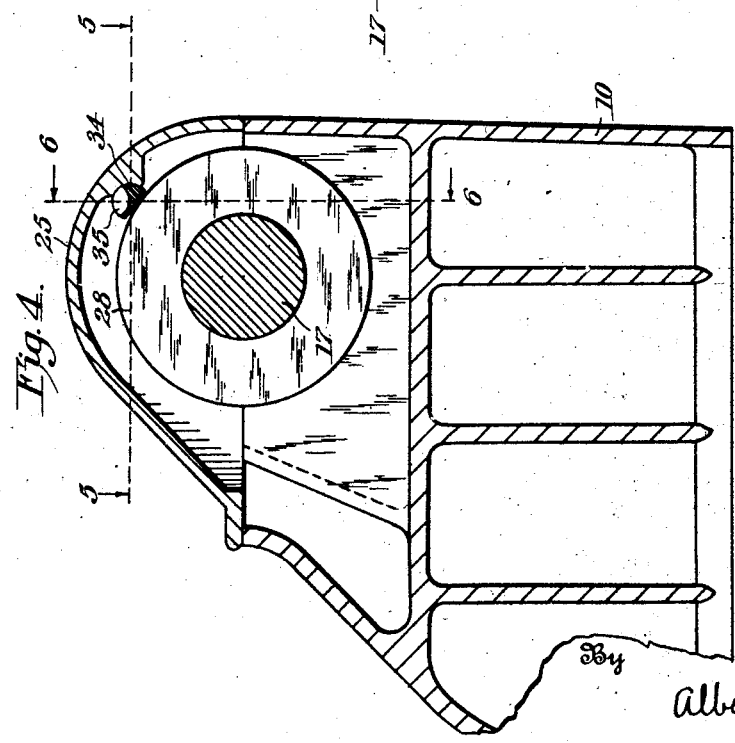
Figure 7:
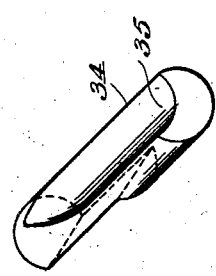

Fig. 1 is a view in longitudinal vertical section of a grinding machine in the construction of which my invention has been embodied. Fig. 2 is a fragmentary detail view on an enlarged scale, in elevation, of the half-bearing shown at the left in Fig. 1, isolated. Fig. 3 is a view of the same in section on the line 3—3 of Fig. 2. Fig. 4 is a transverse vertical section of one of the half-bearings as shown in Fig. 2. Fig. 5 is a horizontal section on the line 5—5 of Fig. 4. Fig. 6 is a vertical section on the line 6—6 of Fig. 4 and Fig. 7 is a perspective of a baffle-member adapted to receive lubricant from the rotating flange and deliver it to the bearing.

In the illustrated embodiment of my invention, the part designated by the reference numeral 1 is the supporting-frame of a grinding machine, in which is mounted rotatably the main driving-shaft 2 provided with a fast-and-loose pulley 3 and main driving-belt 4, while at 5 I have shown a pump working in a chamber 6 for cooling-fluid and operated by suitable gearing, shafts and a belt running from the main shaft portion 8, and the operation of which pump is controlled by a clutch 4, all of which parts may be of any suitable structure, and do not require detailed description, as they do not form an essential portion of my invention.

Any suitable work-support may be provided, and at 7 I have shown a pan mounted in ways upon the frame and serving in part for the support of the work and also to receive the particles ground therefrom.

The preferred structure for carrying my invention into effect, in the embodiment illustrated, comprises a head 10 bolted at 11 upon the supporting-frame 1 and having bosses 12 and 13, which serve respectively as the seats for the duplex half-bearings 15 and 16 in which rotates the spindle-shaft 17.

The head 10 is shown as having a central chamber 18 which contains the pulley 19, splined at 20 upon the middle of the spindle-shaft, and which is actuated by a driving-belt 21 running from a pulley 22 upon the driving-shaft 2, a take-up pulley 23 being provided preferably to tighten the belt to the desired degree. These parts are preferably enclosed within a chamber 24 of the frame, which is in communication with the central chamber 18 above referred to, and I prefer to complete the enclosure of the parts above described by means of a housing-member 25 connected removably to the head 10, so that when desired it may be removed for inspection of the shaft 17, pulley 19 and the devices associated therewith.

In pursuance of my invention, I provide the head 10 with chambers 26 and 27 for the reception of lubricant, as indicated, and these chambers extend upward into the housing-member 25, the spindle-shaft 17 being shown with collars or flanges 28 and 29, constituting lubricant elevators, of which there are preferably two, one for each half-bearing, these flanges dipping, at their lower portions, into the lubricant, and serving to elevate the same, as the flanges turn with the shaft 17, to which they also are connected preferably by the spline 20, as illustrated.

As the shaft 17 normally runs at very high speeds, the lubricant thus elevated will be thrown from the upper periphery of the flanges 28 and 29 into the upper portions of the chambers 26 and 27 and will flow back, to a certain extent, upon shaft 17 and find its way into the half-bearings 15 and 16, the latter being in communication with the chambers 26 and 27.

To prevent the lubricant thus elevated from finding its way into the chamber 18 in which operates the belt 21, any suitable means may be provided, in accordance with my invention, and as one convenient form of such means, I have shown bushings 30, one for each flange, these bushings having grooved ends projecting into the chambers 26 and 27 respectively to receive and divert the lubricant, while each of the flanges 28 and 29 preferably has a hub 31 grooved as indicated at 32 to afford similar channels for reception of the lubricant, the bushings 30 having at their lower interior portions as indicated at 33, (see Fig. 2), channels to receive the lubricant which finds its way into the grooves 32 and to discharge the same into the lower portions of the chambers 26 and 27 respectively, so that no lubricant finds its way into the belt-chamber 18.

In accordance with an important object of my invention, I provide devices for intercepting the major portion of the lubricant elevated and discharged by centrifugal force from the upper portions of the peripheries of the flanges 28 and 29, and any suitable form of device may be provided for this purpose. As one convenient form I have shown in Figs. 2 and 3, (which illustrate one side of the duplex half-bearings) a baffle-member 34 extending transversely across the chamber 26 and grooved at 35 to serve as a spill-way over which the lubricant flows to a lengthwise conduit 36, and thence passes through a drip-tube 37 into a conduit 38 which is in communication with the space 39 in which the shaft 17 and its bearing 15 are situated.

In accordance with my invention I have shown at 40 a glazed window, or closure, for the conduit 38, and through which the operator can observe the shaft 17, and the lubricant flowing from the tube 37, and thus assure himself from time to time that the proper circulation of lubricant continues.

One of these windows will preferably be provided for each of the duplex half-bearings, and each window may be held in place by suitable fastening means, such as the screw 41, and may be removed when access is desired to the bearing-chamber 30 without the need for removing the housing-member 25.

I have shown at 42 an opening through which additional lubricant may be introduced, when desired. The half-bearing 15 may be of any suitable character and I have shown as the preferred form thereof a member of substantially semi-cylindrical shape, occupying a position extending from approximately 30° below the axis of the shaft at the front to a position approximately 30° above the axis at the rear of the shaft 17, in which position it will preferably be secured by suitable means such as the pin 43.

In this position of the member 15 it serves to receive the lubricant at 44 and distribute the same along the bearing-surface of the shaft, by which it is carried around to lubricate the shaft copiously, and in quantities commensurate with the rapidity of the rotation, as the flanges 28 and 29 deliver more or less lubricant according to the speed at which they rotate with the shaft 17.

While the shaft 17 is normally held against the duplex half-bearings 15 and 16 by action of the belt 21 and idler 23, I prefer to provide auxiliary means bearing against the spindle-shaft 17 to hold it in properly seated position upon the half-bearings respectively, and as one convenient form of such means, I have shown blocks 46 held against the upper portion of the shaft by set-screws 47, provided with jam-nuts 48, these blocks serving also as bearing-members, and acting to effect an additional distribution of the lubricant along the shaft for the full length of the bearing.

To complete the means for circulation of the lubricant, I have shown at 45 a conduit formed by slabbing off the lower part of the periphery of the bearing-member 15, this return-conduit 45 extending toward and being in communication with the lower portion of the lubricant-chamber 26.

Where desirable, additional means may be provided for preventing the escape of lubricant from the bearings, and I have shown as one form of such means, a disk 47ª, (see Fig. 1) fitted at the end of the boss 12, being held in place by the hub 48ª of the disk 49 which constitutes the grinding-head in the instance illustrated, grinding means 50 being secured to this disk by a face-plate 51 secured by screws 52, while the head as a whole is held in place by a nut 53 screwed upon the threaded end 54 of the spindle-shaft 17. At 58 I have shown a guard for the grinding-wheel, having a face-plate 59 secured in place by a clamp 60, it being understood that the casing is suitably apertured to permit presentation of articles to be operated upon by the grinding-member 50, this grinding head being illustrated only by way of example.

So also I have shown at 61 a diaphragm, to prevent escape of lubricant at the tail-end bearing of shaft 17, and I prefer to provide at this end a ball-bearing 62, to prevent end-thrust of the spindle-shaft 17, this bearing being carried by a cup 63, secured by screw 64 within the boss 13, and having a closure 65, which serves as an abutment for the ball-bearing 62.

The grinding-machine herein described has a grinding-spindle which can be rotated at extremely high-speeds, for by my invention it is provided with duplex half-bearings of sufficient breadth to cause a minimum of inherent friction, and in such relationship with the shaft-pulley and its driving-belt as to afford maximum stability in operation of the spindle-shaft, this stability being served notably also by my novel arrangement of the half-bearing members and auxiliary bearing-members, which act also to effect repeated distribution of the lubricant over the bearing surfaces of the spindle-shaft. The flanges rotate in connection with the spindle, and therefore automatically elevate from the lubricant-chambers, in which they dip, quantities of lubricant commensurate with the speed of the spindle, and the lubricant so elevated is also distributed evenly throughout the bearings, and its circulatory return to the lubricant-chamber is insured, by the devices for intercepting and conducting the lubricant.

The duplex lubricant-chambers are isolated from the central belt-chamber, and the duplex flanges have auxiliary means respectively to avoid transmission of lubricant to the belt-chamber, so that the belt runs free from slippage, yielding its maximum driving effect.

The complete enclosure of the working parts prevents accident to them and to the operator, and the provision of glazed sight-openings, and also the construction of the supporting structure with parts readily removable to give access to the working parts, facilitates the operation of the machine without interruption.

Without further analysis, the foregoing will so fully reveal the gist of this invention that others can, by applying current knowledge, readily adapt it for various utilizations by retaining one or more of the essential characteristics of either the generic or specific aspects of this invention, and, therefore, such adaptations should be, and are intended to be, comprehended within the meaning and range of equivalency of the following claim:—

Having thus revealed this invention, I claim as new and desire to secure the following combinations and elements, or equivalents thereof, by Letters Patent of the United States:—

In a grinding machine, in combination a support; two bearings carried by said support; a shaft journaled in said two bearings; two lubricant wells formed wholly within and integral with said support each of said wells being located wholly at one side of each of said bearings; a lubricant slinger disposed in each well and contacting with the lubricant therein, said lubricant slinger being mounted on and rotated by said shaft; a combined receiving trough and lubricant conveyor operatively connected with each well, each trough having an open end secured within a closed bore in said support and a closed end adjacent said lubricant slinger whereby the trough receives lubricant cast off by its slinger and conveys it laterally away from said slinger and over its adjacent bearing; a tube extending downwardly from said closed bore towards each of said bearings and adapted to deliver lubricant to said bearing; said bearings each being provided with a duct to return the lubricant back to the well from whence it came.

In witness whereof, I hereunto subscribe my name.

SOL EINSTEIN.